United States Patent Office 3,010,941
Patented Nov. 28, 1961

3,010,941
FLAME-RESISTANT SPIROBI(META-DIOXANE) PHENOLIC COMPOSITIONS
Howard R. Guest, Charleston, and Ben W. Kiff, Ona, W. Va., assignors to Union Carbide Corporation, a corporation of New York
No Drawing. Filed Aug. 29, 1958, Ser. No. 757,899
14 Claims. (Cl. 260—47)

This invention relates to a new class of resins derived from 3,9-dialkenylspirobi(meta-dioxane) derivatives. In a particular aspect, this invention relates to resins containing spirobi(meta dioxane) and phenolic groups, and chemically-bound phosphorus.

Resins formed by the polymerization of spirobi(meta-dioxane) derivatives with phenols have many properties which make them commercially attractive. They are hard and tough and can be made with good clarity and color. However, in common with most other organic plastic materials commercially available, they suffer the disadvantage of being flammable. In many applications, particularly in the structural field, there would be great advantage in having a strong, tough, rigid plastic with excellent weatherability characteristics which at the same time was flame-resistant.

A conventional method of reducing the flammability of a plastic is to incorporate mechanically a phosphorus-containing plasticizer into the plastic by milling or other similar operation. Considerable quantities of such plasticizers are required to produce this flame-resistance property in the plastic. Usually the plasticizer modifies other properties of the plastic in a beneficial way at the same time. Plasticizers of this type include compounds such as tricresyl phosphate and trioctyl phosphate.

This method of reducing the flammability of plastics with phosphorus-containing plasticizers is not practical for polymers produced from spirobi(meta-dioxane) derivatives and phenols. These polymers are not compatible with many of the phosphorus-containing plasticizers, and when proper compatibility between the polymers and plasticizers is accomplished it is found that many of the desirable properties of the polymers are adversely effected. Further, no additive is known which can be mixed mechanically with spirobi(meta-dioxane) phenolic polymers to produce non-flammable compositions.

It is a main object of this invention to provide flame-resistant spirobi(meta-dioxane) phenolic polymers. Other objects and advantages of this invention will become apparent to those skilled in the art from the accompanying description and disclosure.

Accordingly, flame-resistant polymers are produced by reacting together a mixture of 3,9-dialkenylspirobi(meta-dioxane), a phenol, and a partial phosphite ester derivative of pentaerythritol. The polymers so produced contain chemically-bound phosphorus as a substantive part of the polymers.

The 3,9-dialkenylspirobi(meta-dioxane) derivatives contemplated are those having alkenyl substituents in the three-position and in the nine-position, each alkenyl substituent containing between two and about eighteen carbon atoms. The respective alkenyl groups can be identical or different species. A particularly useful group of these unsaturated acetal compounds are those derived from the reaction of acrolein and substituted acroleins with pentaerythritol. Such unsaturated acetals may be represented by the formula:

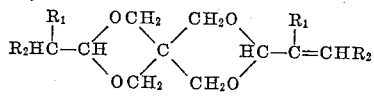

wherein $R_1$ is hydrogen, methyl or chlorine, and $R_2$ is hydrogen or methyl.

Unsaturated acetals which correspond to the formula include:

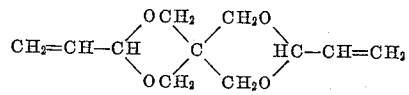

3,9-divinylspirobi(meta-dioxane)

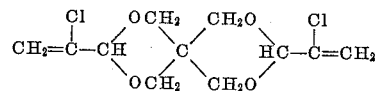

3,9-di(1-chlorovinyl)spirobi(meta-dioxane)

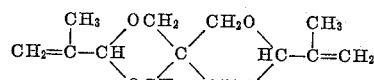

3,9-diisopropenylspirobi(meta-dioxane)

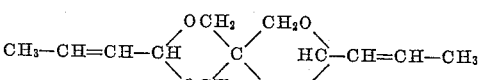

3,9-dipropenylspirobi(meta-dioxane)

Unsaturated spirobi(meta-dioxane) derivatives are readily prepared by the condensation of a mole of pentaerythritol with two moles of an unsaturated aldehyde or ketone, or mixtures thereof, in the presence of an acid catalyst such as p-toluenesulfonic acid. The following reaction schemes are illustrative of the general synthetic method. When acrolein is employed, an unsubstituted 3,9-divinylspirobi(meta-dioxane) is obtained:

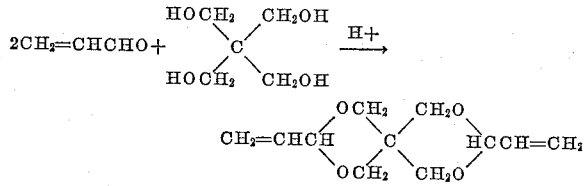

When the condensation is conducted with an unsaturated ketone, then the three- and nine-positions of the spirobi(meta-dioxane) nucleus obtained have two substituents rather than one:

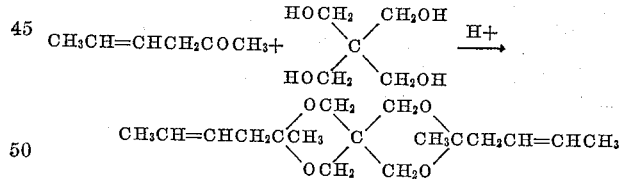

It is not necessary that the unsaturated aldehyde or ketone reacted with pentaerythritol be pure or a single species. Mixtures of unsaturated aldehydes and/or ketones may be condensed with pentaerythritol. The resulting products are mixtures of 3,9-olefinically-substituted spirobi(meta-dioxane) compounds which may be resolved into pure components or which may be used as a crude mixture directly in polymerization reactions.

The partial phosphite ester derivatives of pentaerythritol contemplated for chemically incorporating phosphorus into the polymers to make them flame-resistant can be prepared by a transesterification reaction between pentaerythritol and a molar equivalent or less of a trialkyl phosphite. A major portion of the transesterification reaction appears to proceed in the following manner:

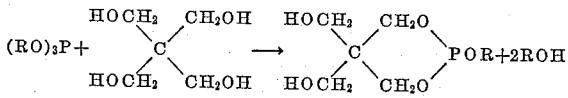

The transesterification reaction is preferably conducted between pentaerythritol and a phosphite ester which is the derivative of an alcohol that can be removed continuously from the transesterification reaction medium as the reaction proceeds. The ester is in equilibrium with both pentaerythritol and the exchanged alcohol so that the removal of the exchanged alcohol moiety is necessary to produce a favorable shift of the reaction equilibrium in the direction of pentaerythritol partial phosphite ester formation. For example, triethyl phosphite and triisopropyl phosphite are especially suitable for this transesterification method of producing pentaerythritol partial phosphite esters because both ethanol and isopropanol can be continuously distilled off under atmospheric pressure without any difficulty and a high yield of desired product is obtained. The pentaerythritol partial phosphite esters, or mixtures thereof, preferred, are those which have an average of at least two free hydroxy groups per ester molecule available for reaction with 3,9-dialkenylspirobi(meta-dioxane) derivatives to produce flame-resistant resins.

The phenol derivatives which can be employed in the practice of this invention are the compounds of this class which contain at least two positions ortho or para to a phenolic hydroxyl group on an aromatic hydrocarbon nucleus which are susceptible to substitution reactions, e.g., compounds having positions ortho and para to a phenolic hydroxyl group which contain an active hydrogen substituent that can be displaced by an electrophilic reagent. The phenols contemplated include mononuclear phenols such as phenol, chlorophenol, resorcinol, p-phenylphenol, phloroglucinol, hydroquinone, cresol, m-xylenol, beta-naphthol, mixtures of phenols from coal tar or coal hydrogenation fractions, and the like; dinuclear phenols such as 2,2-bis(p-hydroxyphenyl)propane, bis-(p-hydroxyphenol)methane and isomeric diphenylol methanes disclosed in Bender et al., United States Patent No. 2,744,882, and the diphenols disclosed in Bender et al., United States Patent No. 2,506,486, and the like; trinuclear phenols such as 1,1,3-tris(hydroxyphenyl)propane, 1,1,3-tris(hydroxytolyl)-propane, 1,1,3-tris(hydroxyphenyl)propene-2, 1,1,3-tris(hydroxyphenyl)-2-methylpropane, and the like; and other higher polynuclear phenols. The terms "mononuclear phenol," "dinuclear phenol" etc., designate the number of aromatic hydrocarbon nuclei in a compound containing at least one phenolic hydroxyl group. For example, by "mononuclear phenol" is meant a compound having one aromatic hydrocarbon nucleus which contains one or more phenolic hydroxy groups, such as cresol or resorcinol. The expression "a phenol" as used hereinafter is meant to include all phenol derivatives within the scope of the foregoing definition.

The reaction for producing flame-resistant spirobi(meta-dioxane) polymers can be conducted by the simple expediency of heating a mixture of 3,9-dialkenylspirobi-(meta-dioxane), a phenol, and partial phosphite ester of pentaerythritol at a temperature between about 100° C. and 150° C. The polymerization may require a reaction period of twenty-four hours or longer at the lower reaction temperatures, and a reaction period as short as five minutes may be satisfactory to complete the curing of the polymer product at the higher temperatures.

The relative concentrations of the reactants can be varied over a wide range in producing the flame-resistant resins. For example, phenol has three reactive ortho and para positions (trifunctional) and 3,9-dialkenylspirobi-(meta-dioxane) has two double bonds (difunctional) so that the theoretical combining ratio is one and one-half moles of 3,9-dialkenylspirobi(meta-dioxane) for every mole of phenol. Resins with desirable properties can be produced over the range of between one mole and three moles of 3,9-dialkenylspirobi(meta-dioxane) for every mole of phenol. Generally, it is practical to use not less than one and one-half moles of 3,9-dialkenylspirobi(meta-dioxane) for each mole of phenol reacted. Preferably, a quantity of 3,9-dialkenylspirobi(meta-dioxane) is employed which is equivalent to the functionality of both the phenol and the pentaerythritol partial phosphite ester.

As mentioned previously, the pentaerythritol partial phosphite ester has free hydroxyl groups which react with olefinic groups during the polymerization reaction.

The quantity of partial phosphite ester employed is not narrowly critical. The preferred weight range of partial phosphite ester incorporated into the resin is between about 5 percent and 25 percent of the weight of reactants, i.e., the total weight of 3,9-dialkenylspirobi-(meta-dioxane), phenolic derivative and partial phosphite ester reactants. Quantities less than about 5 percent by weight may be incorporated into the compositions but it has been found in many cases that the resins containing these lesser quantities of pentaerythritol partial phosphite ester support combustion and are not self-extinguishing. Similarly, quantities of pentaerythritol partial phosphite ester in excess of about 25 percent by weight of the total weight of reactants polymerized can be employed if desired. However, such larger quantities of pentaerythritol partial phosphite ester do not appreciably increase the flame-resistance of the resins and they may deleteriously affect other characteristics of the resins.

It is desirable to conduct the polymerization reaction in the presence of an acidic curing catalyst to promote a reasonable reaction rate. Satisfactory curing catalysts include acidic catalysts such as sulfuric acid, hydrochloric acid, toluenesulfonic acid, benzenesulfonic acid, boron trifluoride, aluminum chloride, dialkyl sulfates such as diethyl sulfate, dimethyl sulfate, diisopropyl sulfate and the like, titanium tetrachloride, phenyl acid phosphate, octylphenyl acid phosphate, and the like. Curing catalyst concentrations can vary from as little as 0.1 percent by weight for the more active catalysts, up to 1.0 weight percent or higher for the less active catalysts, based on the total weight of the reaction mixture.

In another method found convenient for preparing flame-resistant polymers, 3,9-dialkenylspirobi(meta-dioxane) and a phenol are reacted together in suitable proportions to produce a liquid pre-condensate A-stage resin in the presence of an acid catalyst. The pre-condensate polymerization reaction is conducted at a temperature between about 100° C. and 150° C. for a period of time between one-half hour and five hours depending on the viscosity desired for the A-stage resin. After volatile materials have been removed by distillation, the A-stage resin is usually a viscous liquid which slowly condenses to a solid plastic on standing. For practical purposes, the condensation can be stopped by neutralization or removal of the catalyst. The neutral A-stage resin can be stored until needed.

Flame-resistant polymers are prepared from the A-stage resin by mixing a calculated quantity of partial phosphite ester of pentaerythritol into the said resin and heating the mixture until complete curing is obtained. A curing catalyst is also added to the mixture, unless the catalyst employed for preparing the pre-condensate A-stage resin is still present in the mixture in a sufficient quantity to promote formation of a cured, flame-resistant resinous product. This final cure can be accomplished at the same temperature used for the formation of the intermediate A-stage resin, or at higher temperatures.

The flame-resistant spirobi(meta-dioxane) phenolic polymers of this invention can be employed to produce molded articles, laminates, or any product for which other thermosetting resins are used. The polymers of this invention have the advantage of being self-extinguishing when ignited, besides being strong, tough and rigid.

These flame-resistant polymers also have the advantage over many other thermoset resins in that they cured without the formation of volatile by-products, such as water, and there is little or no shrinkage during the curing process.

The following examples will serve to illustrate specific embodiments of this invention. The first three examples demonstrate the flammability of spirobi(meta-dioxane)

phenolic resins which do not contain polymer-bound phosphorus.

Example 1

A charge of 3,9-divinylspirobi(meta-dioxane) (405 grams), phenol (120 grams), and diethyl sulfate (1.68 grams) was placed in a reaction flask and heated for a period of fifty minutes at a temperature of 100° C. to 120° C. At the conclusion of the reaction period, the liquid resin was poured into molds and cured for a period of sixteen hours at a temperature of 150° C. The resulting cured polymer was a dark, hard material with the following properties:

Heat distortion _____° C__ 149
Hardness, durometer "D" _____ 81
Impact strength (Izod), ft. lbs./in. of notch _____ 0.75

A thin bar (5" x ½" x ⅛") of this material was tested for flammability according to ASTM–D635–44. The bar burned for twenty-three minutes after it was ignited.

Example 2

A mixture of 3,9-divinylspirobi(meta-dioxane) (318 grams) and 1,1,3-tris(hydroxyphenyl)propane (160 grams) was heated to a temperature of 100° C. until it became homogeneous. The mixture was then cooled to 53° C. and mixed alkanesulfonic acid (0.72 gram) was added. The liquid pre-condensate was poured into molds and cured for a period of six hours at a temperature of 150° C. The resulting polymer was hard, smooth and glossy, and had the following properties:

Heat distortion _____° C__ 192
Impact strength (Izod), ft. lbs./in. of notch _____ 0.4

A thin bar (5" x ½" x ⅛") of this material was ignited and it burned for fourteen minutes before the flame was extinguished.

Example 3

A charge of 3,9-divinylspirobi(meta-dioxane) (64 grams), 2,2-(p-hydroxyphenyl)propane (24.6 grams) and diethyl sulfate (0.39 gram) was heated with stirring for a period of fifteen minutes at a temperature of 110° C. The liquid pre-condensate was then poured into molds and cured for a period of eight hours at a temperature of 150° C. The resulting polymer was a hard, tough, glossy solid. A thin bar (5" x ½" x ⅛") of the material was tested for flammability according to ASTM–D635–44, and it burned for eight and one-half minutes before it extinguished.

Example 4

A charge of pentaerythritol (408 grams, 3 moles) and triethyl phosphite (336 grams, 2 moles) was charged to a flask which was fitted with a distillation column. The mixture was heated to a temperature of 130° C. and ethanol began to distill off. After two hours of heating the temperature rose to 160° C. and at this point no more distillate was evident. The total distillate weighed 232 grams and consisted largely of ethanol and some unreacted triethyl phosphite. The contents of the flask were heated at a temperature of 160° C. for an additional four hours, and then reaction mixture components were distilled off which were volatile at a temperature of 150° C. under a pressure of 2 millimeters of mercury. A viscous, colorless liquid product (451 grams) was recovered which was shown by elemental analysis to contain 37.64 percent carbon, 7.20 percent hydrogen and 7.80 percent phosphorus. The observed molecular weight of the product was 210, and the equivalent weight was 106 as determined by hydroxyl analysis. The physical constants of the product indicated that a substantial portion of the material was a partial phosphite ester having two free hydroxyl groups per molecule:

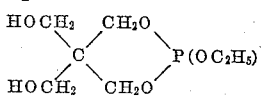

Example 5

A liquid pre-condensate was prepared by reacting 3,9-divinylspirobi(meta-dioxane) (945 grams) with phenol (280 grams) in the presence of diethyl sulphate catalyst (3.68 grams). A portion of this liquid pre-condensate (133 grams) was mixed with 7 grams of partial phosphite ester prepared according to the method described in Example 4. The partial phosphite ester was 5.0 percent by weight of the total charge. After the mixture was heated for a period of forty minutes at a temperature of 110° C. to 115° C., it was poured into molds and cured for sixteen hours at a temperature of 150° C. The resulting polymer was hard, tough, clear and smooth, and was self-extinguishing within eight seconds when a thin bar (5" x ½" x ⅛") was tested for flammability according to ASTM–D635–44.

Example 6

A liquid pre-condensate was prepared by reacting 3,9-divinylspirobi(meta-dioxane) (945 grams) with phenol (280 grams) in the presence of diethyl-sulphate catalyst (3.68 grams). A portion of this liquid pre-condensate (133 grams) was mixed with 7 grams of partial phosphite ester prepared according to the method described in Example 4. The partial phosphite ester was 5.0 percent by weight of the total charge. After the mixture was heated for a period of forty minutes at a temperature of 110° C. to 115° C., it was poured into molds and cured for sixteen hours at a temperature of 150° C. The resulting polymer was hard, tough, clear and smooth, and was self-extinguishing within eight seconds when a thin bar (5" x ½" x ⅛") was tested for flammability according to ASTM–D635–44.

Example 7

The preceding example was repeated employing 126 grams of liquid pre-condensate and 14 grams of partial phosphite ester additive. The partial phosphite ester was 10 percent by weight of the total charge. The reaction mixture was heated for thirty minutes at a temperature of 110° C. to 115° C., then it was poured into molds and cured sixteen hours at a temperature of 150° C. The resulting hard, smooth polymer was self-extinguishing within two seconds when a thin bar (5" x ½" x ⅛") was tested for flammability according to ASTM–D635–44.

Example 8

The preceding example was repeated employing 119 grams of liquid pre-condensate and 21 grams of partial phosphite ester prepared in the manner of Example 4. The partial phosphite ester was 15 percent by weight of the total charge. After the reaction mixture was heated for forty-five minutes at a temperature of 113° C., it was poured into molds and cured for sixteen hours at a temperature of 150° C. The resulting polymer was hard, tough, smooth and glossy and was self-extinguishing within five seconds when a thin bar (5" x ½" x ⅛") was tested for flammability by the standard method.

Example 9

A charge of 3,9-divinylspirobi(meta-dioxane) (60 grams) and 1,1,3-tris(hydroxyphenyl)propane (30 grams) was heated at a temperature of 110° C. until a uniform solution was formed. Pentaerythritol partial phosphite ester (4.8 grams) prepared according to the procedure of Example 4, and diethyl sulfate (0.415 gram) were added. The partial phosphite ester was 5.0 percent by weight of the total charge. The reaction mixture was heated for a period of nine minutes at a temperature of 100° C. to 105° C., and then poured into molds and cured for ten hours at a temperature of 150° C. The hard, glossy polymer which resulted was self-extinguishing within two minutes when a thin bar (5" x ½" x ⅛") was tested for flammability by the standard method.

Example 10

A charge of 3,9-divinylspirobi(meta-dioxane) (64 grams) and 1,1,3-tris(hydroxyphenyl)propane (30 grams) was heated until a homogeneous solution was formed. Pentaerythritol partial phosphite ester (10.6 grams), prepared according to the procedure of Example 4, and diethyl sulfate (0.414 gram) were added and the mixture was heated for ten minutes at a temperature of 110° C. The partial phosphite ester was 10 percent by weight of the total charge. After the material was poured into molds and cured for ten hours at a temperature of 150° C., the hard, smooth glossy polymer which resulted was self-extinguishing within six seconds when a thin bar (5" x ½" x ⅛") was tested for flammability according to the standard method. The test was repeated and the flame persisted for eight seconds.

*Example 11*

3,9-divinylspirobi(meta-dioxane) (69 grams) and 2,2-(p-hydroxyphenyl)propane (34.6 grams) were melted together and pentaerythritol partial phosphite ester (11.6 grams) prepared according to the procedure of Example 4, was added. The partial phosphite ester was 10 percent by weight of the total resin charge. Diethyl sulfate (0.615 gram) was then added and the mixture was heated for ten minutes at a temperature of 100° C. After the material was poured into molds and cured for nine hours at a temperature of 150° C., a hard, glossy polymer resulted which was self-extinguishing within ten seconds when a thin bar (5" x ½" x ⅛") was tested for flammability according to the standard method.

*Example 12*

3,9-divinylspirobi(meta-dioxane) (74 grams) and 2,2-(p-hydroxyphenyl)propane (34.6 grams) were heated until a uniform solution was formed and pentaerythritol partial phosphite ester (19.2 grams), prepared according to the procedure of Example 4, was added. The partial phosphite ester was 15 percent by weight of the total resin mixture. Diethyl sulfate (0.522 gram) was added, and after heating for ten minutes at a temperature of 110° C., the reaction mixture was poured into molds and cured for nine hours at a temperature of 150° C. The hard, glossy, tough polymer which resulted was self-extinguishing within five seconds when tested by the standard method.

*Example 13*

3,9-divinylspirobi(meta-dioxane) (71 grams), 1,1,3-tris(hydroxyphenyl)propane (30 grams), pentaerythritol partial phosphite ester (18 grams) and diethyl sulfate (0.564 gram) were mixed and reacted according to the procedure of the preceding example. The partial phosphite ester was 5 percent by weight of the total resin composition. The mixture was heated for a period of eight minutes at a temperature of 100° C. and then poured into molds and cured for a period of ten hours at a temperature of 150° C. The resulting hard, brown, glossy polymer was self-extinguishing when tested for flammability by the standard method and was self-extinguishing within three second when tested a second time.

*Example 14*

A mixture of 3,9-divinylspirobi(meta-dioxane) (58 grams) and phenol (16 grams) was treated with 13.6 grams of pentaerythritol partial phosphite ester prepared according to the procedure of Example 5 and heated for five minutes at a temperature of 100° C. The partial phosphite ester was 15 percent by weight of the total composition. Diethyl sulfate (0.42 gram) was then added and the mixture was heated for an additional ten minutes at a temperature of 100° C., and then poured into molds and cured for ten hours at a temperature of 150° C. The resulting polymer was hard, light brown and tough, and was self-extinguishing within five seconds when tested for flammability by the standard method.

*Example 15*

A mixture of 3,9-divinylspirobi(meta-dioxane) (74 grams) and 2,2-(p-hydroxyphenyl)propane (34.6 grams) was heated until a uniform solution was produced, and pentaerythritol partial phosphite ester (19.2 grams), produced according to the procedure of Example 5, was added. The partial phosphite ester was 15 percent by weight of the total composition. Diethyl sulfate (0.56 gram) was then added and the mixture was heated for ten minutes at a temperature of 100° C. and then poured into molds and cured for a period of ten hours at a temperature of 150° C. The hard, glossy polymer which resulted was self-extinguishing within ten seconds when tested for flammability according to the standard method.

What is claimed is:

1. A curable composition comprising 3,9-dialkenylspirobi(meta-dioxane) having between two and eighteen carbon atoms in each alkenyl radical, phenol, and between about 5 percent and 25 percent by weight, based on the total composition weight, of partial phosphite ester of pentaerythritol having the formula:

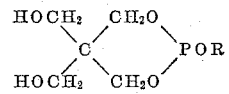

wherein R is an alkyl group.

2. A curable composition comprising 3,9-dialkenylspirobi(meta-dioxane) having between two and eighteen carbon atoms in each alkenyl radical, 2,2-(p-hydroxyphenyl)propane, and between about 5 percent and 25 percent by weight, based on the total composition weight, of partial phosphite ester of pentaerythritol, having the formula:

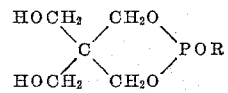

wherein R is an alkyl group.

3. A curable composition comprising 3,9-dialkenylspirobi(meta-dioxane) having between two and eighteen carbon atoms in each alkenyl radical, 1,1,3-tris(hydroxyphenyl)propane, and between about 5 percent and 25 percent by weight, based on the total composition weight, of partial phosphite ester of pentaerythritol, having the formula:

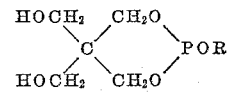

wherein R is an alkyl group.

4. A curable composition comprising 3,9-divinylspirobi(meta-dioxane), phenol, and between about 5 percent and 25 percent by weight, based on the total composition weight, of partial phosphite ester of pentaerythritol having the formula:

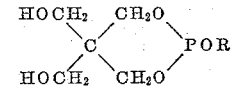

wherein R is an alkyl group.

5. A curable composition comprising 3,9-dipropenylspirobi(meta-dioxane), phenol, and between about 5 percent and 25 percent by weight, based on the total composition weight, of partial phosphite ester of pentaerythritol having the formula:

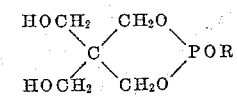

wherein R is an alkyl group.

6. A curable composition comprising 3,9-diisopropenylspirobi(meta-dioxane), phenol, and between about 5 percent and 25 percent by weight, based on the total composition weight, of partial phosphite ester of pentaerythritol, having the formula:

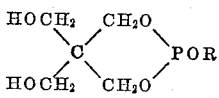

wherein R is an alkyl group.

7. A curable composition comprisng 3,9-di(1-chlorovinyl)spirobi(meta-dioxane), phenol, and between about 5 percent and 25 percent by weight, based on the total composition weight, of partial phosphite ester of pentaerythritol having the formula:

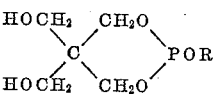

wherein R is an alkyl group.

8. A process for preparing resins which comprises heating at reaction temperature a mixture comprising 3,9-dialkenylspirobi(meta-dioxane) having between two and eighteen carbon atoms in each alkenyl radical, a phenol having at least two hydrogen atoms ortho-para to a phenolic hydroxyl group, and between about 5 percent and 25 percent by weight, based on the total composition weight, of partial phosphite ester of pentaerythritol having the formula:

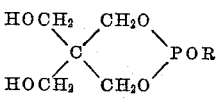

wherein R is an alkyl group.

9. A process for preparing flame-resistant resins which comprises heating at reaction temperature 3,9-divinylspirobi(meta-dioxane), phenol, and between about 5 percent and 25 percent by weight, based on the total composition weight, of partial phosphite ester of pentaerythritol having the formula:

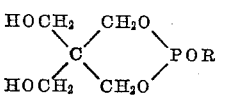

wherein R is an alkyl group, in the presence of an acidic catalyst.

10. The process of claim 9 wherein the acidic catalyst is dialkyl sulfate.

11. The process of claim 10 wherein said dialkyl sulfate is diethyl sulfate.

12. A process for preparing flame-resistant resins which comprises heating at a temperature between about 100° C. and 150° C. a phenol having at least two hydrogen atoms ortho-para to a phenolic hydroxyl group with 3,9-dialkenylspirobi(meta-dioxane) having between two and eighteen carbon atoms in each alkenyl radical in the presence of an acidic catalyst to form a partially cured mixture, and heating at a temperature between about 100° C. and 150° C. said partially cured mixture with partial phosphite ester of pentaerythritol having the formula:

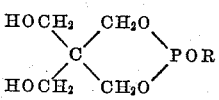

wherein R is an alkyl group, to form a solid polymer.

13. A curable composition comprising 3,9-dialkenylspirobi(meta-dioxane) having between two and eighteen carbon atoms in each alkenyl radical, a phenol having at least two hydrogen atoms ortho-para to a phenolic hydroxyl group, and between about 5 percent and 25 percent by weight, based on the total composition weight, of partial phosphite ester of pentaerythritol having the formula:

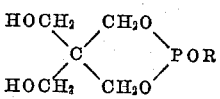

wherein R is an alkyl group.

14. The composition of claim 13 cured at a temperature between 100° C. and 150° C.

References Cited in the file of this patent

UNITED STATES PATENTS

| 2,401,776 | Rothrock | June 11, 1946 |
| 2,915,499 | Wilson et al. | Dec. 1, 1959 |

FOREIGN PATENTS

| 588,833 | Great Britain | June 4, 1947 |

UNITED STATES PATENT OFFICE
CERTIFICATE OF CORRECTION

Patent No. 3,010,941                                      November 28, 1961

Howard R. Guest et al.

It is hereby certified that error appears in the above numbered patent requiring correction and that the said Letters Patent should read as corrected below.

Column 6, line 2, beginning with "A liquid pre-condensate", strike out all to and including "to ASTM-D635—44." in line 17, same column 6 and insert instead the following:

> A charge of pentaerythritol (408 grams, 3 moles) and triisopropyl phosphite (416 grams, 2 moles) was placed in a distillation flask and heated to a temperature of 160° C. At this temperature, the reaction mixture began to reflux and isopropanol began to distill off. After a six-hour reaction period, the temperature began to rise and the presence of isopropanol was no longer evident. The reaction mixture was then stripped by distillation of components volatile at a temperature of 155° C. under a pressure of 5 millimeters of mercury. A residual product was recovered which weighed 477 grams and had a phosphorus content of 11.45 percent.

Signed and sealed this 1st day of May 1962.

(SEAL)
Attest:

ERNEST W. SWIDER
Attesting Officer

DAVID L. LADD
Commissioner of Patents